United States Patent [19]

Gregory

[11] Patent Number: 5,321,902
[45] Date of Patent: Jun. 21, 1994

[54] DUMP BLOCK FOR STRIP MINE RIGGING APPARATUS

[76] Inventor: George Gregory, 1114 Brookshire, Tyler, Tex. 75703

[21] Appl. No.: 962,292

[22] Filed: Oct. 16, 1992

[51] Int. Cl.$^5$ .............................................. E02F 3/46
[52] U.S. Cl. ........................................ 37/397; 37/399; 37/395; 384/563; 254/416
[58] Field of Search ................. 37/115, 116, 135, 397, 37/396, 401, 395, 394, 399; 384/563, 475, 588; 254/416

[56] References Cited

U.S. PATENT DOCUMENTS

| | | | |
|---|---|---|---|
| 1,927,241 | 9/1933 | McCullough | 254/416 X |
| 2,814,890 | 12/1957 | Mutti | 37/135 |
| 2,904,906 | 9/1959 | Smith | 37/135 |
| 3,684,245 | 8/1972 | Marichev et al. | 254/416 X |
| 4,640,496 | 2/1987 | Van Hoomissen et al. | 254/416 X |
| 5,061,089 | 10/1991 | Bair et al. | 384/563 X |

OTHER PUBLICATIONS

Brochure by Esco entitled "Exploded View of Swivel Dump Block", p. 6.9.

Primary Examiner—Randolph A. Reese
Assistant Examiner—J. Russell McBee
Attorney, Agent, or Firm—Hubbard, Tucker & Harris

[57] ABSTRACT

The present dump block (100) comprises an internal plate (106) attached to an external plate (108) with a rotatably mounted sheave (110) therebetween. The external plate (108) presents a smooth convex surface. Bearings (126) are mounted between the sheave (110) and a centrally located shaft (122). The position of the bearings (126) is maintained by a bearing side plate (116) A side plate bearing cushion (124) is located between the bearing side plate (116) and the bearings (126). The bearing cushion (124) absorbs the force of any impacts experienced by the dump block (100). Likewise, the convex surface of the external plate (108) turns any impact into a glancing blow, thereby extending the life of the dump block (100).

9 Claims, 3 Drawing Sheets

DUMP BLOCK FOR STRIP MINE RIGGING APPARATUS

TECHNICAL FIELD OF THE INVENTION

The present invention relates to a dump block for strip mine rigging apparatus. Specifically, the dump block has smooth convex external sides, and a bearing cushion to diminish the effect of an impact experienced during strip mining operations.

BACKGROUND OF THE INVENTION

Strip mining is a common method of mining coal or excavating large areas of land. Therefore, strip mining operations involve the use of extremely heavy and rugged digging equipment capable of moving millions of pounds of earth. Typically, drag lines manipulate the position of a "bucket" used to dislodge, hold, and remove the soil from the site. A bucket can be virtually any size. For example, a bucket can be 35 feet long, 20 feet wide and 15 feet in depth, and weigh approximately 100,000 pounds. One end of the bucket is open with a toothed lower lip. The bucket is attached to a boom by a number of wire ropes and chains. These ropes and chains can bear the weight of the load in the bucket as well as control the orientation of the bucket.

One method of strip mining, known as "chopping," tips the bucket vertically with the toothed lip downward. The bucket is lifted several hundred feet above the ground and then allowed to free fall into the ground. The weight of the falling bucket dislodges a large quantity of soil which is then contained within the bucket. The bucket is then lifted and tilted to a horizontal orientation to prevent the soil from falling out of the bucket. The bucket is next moved to another location and tilted vertically. A dump block is an essential component in the dumping procedure. It allows for the smooth transition of forces between the hoist chains and the drag chains. It is imperative that the dump block not fail.

Prior dump block designs provide a housing around the dump block sheave. This housing consists of a pair of opposed internal plates with each attached to an external plate. The sheave is rotatably mounted around a centrally located shaft and within the housing. The external plate is generally circular with a plurality of ribs extending from a central hub to an external band. Each rib has a central portion or web of increased sectional diameter for increased strength. However, the web portion protrudes. The protruding webs often strike the dump ropes damaging the ribs and/or severing the ropes. Moreover, rocks and dirt can enter the housing between the ribs. These contaminants can jam the sheave, preventing it from rotating. The bearings upon which the sheave rests are also susceptible to failure due to the jarring impacts suffered by the dump block in use.

Therefore, a need exists for a new dump block design which minimizes the incidence and severity of impacts during use. Such a dump block should incorporate a housing with an external plate which maintains the same strength of a ribbed external plate but is less likely to impact directly with the dump ropes. In the event of an impact, the new external plate should angle off the force of the blow. Also, the external plate should minimize the likelihood of damaging the dump ropes. An improved dump block should also cushion the sheave bearings to increase their useful life.

SUMMARY OF THE INVENTION

The present invention relates to a dump block which addresses the inadequacies in the prior art. Specifically, the present dump block has a housing with a rotatable sheave therein. The sheave rotates around a central shaft. The housing is formed by a pair of opposed and substantially parallel internal plates each of which is individually attached to an external plate. Each external plate presents a smooth convex surface. Thus any blow to the dump block becomes a glancing blow. Also, the solid side diminishes the introduction of contaminants into the housing.

Bearings are placed between the sheave and the shaft. A straight shaft is used. A side plate bearing cap maintains the position of the bearings. A bearing cushion is placed between the bearing and the side plate bearing cap. Thus, the force of any impact to the dump block is diminished. Also, because the shaft is straight, no force can be transmitted by the shaft to the bearings. Protection of the bearings significantly improves the life span of the dump block.

Additionally, the entrance to the dump block for the dump rope is smooth. The entrance is formed between the to internal plates adjacent to where the internal and external plates are attached. Therefore, the point of attachment is curved to present a smooth surface to the dump rope. A hard edge can rub against the dump rope causing it to fray and fail.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1:
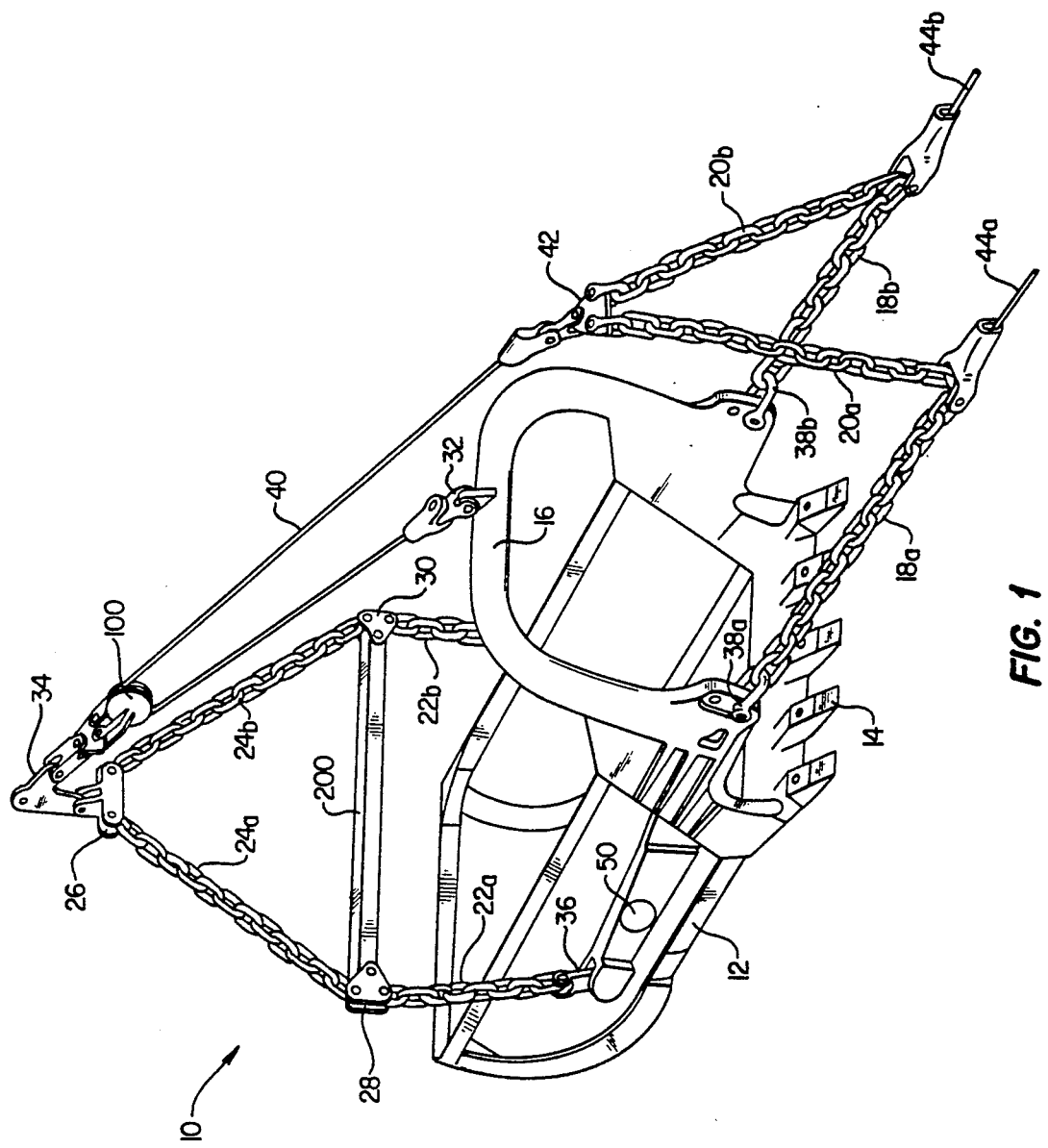
FIG. 1 is a perspective exploded view of a bucket assembly including a dump block in accordance with the present invention.

The present invention relates to a dump block for strip mine rigging apparatus that overcomes many of the disadvantages found in the prior art. Referring to FIG. 1, a dump block 100 embodying the present invention is shown in a perspective view attached to a bucket assembly. Each element of the present dump block 100 is typically made of steel. The components can be coated with a rust resistant coating as well as an abrasion resistant coating.

The bucket assembly 10 generally comprises a bucket 12 with a plurality of forward projecting teeth 14 and a forward arch 16. The bucket 12 is moved and manipulated by several sets of chains. Hoist chains 22a, 22b, 24a, 24b are attached to the bucket behind the bucket's center of gravity. Drag chains 18a, 18b are attached to the forward portion of the bucket 12 on either side of the bucket mouth. Drag ropes 44a, 44b are attached to both the drag chains 18a, 18b and to the dump chains 20a, 20b.

A dump block 100 is shown attached between arch 16 and the drag chains 18a, 18b. A dump rope 40 extends around the dump block with one end of the dump rope attached to arch 16 and the other end attached to dump chains 20a, 20b. In operation, the bucket is dropped vertically into the ground. Next, tension is applied to the drag chains 18a, 18b causing the bucket to assume a horizontal position. The bucket is lifted from the ground several feet to facilitate moving the bucket and load to a dump site. To lift the bucket and load, tension is applied to both the hoist chains 22a, 22b, 24a, 24b and to drag ropes 44a, 44b. The resultant force on the bucket keeps the bucket horizontal. Dumping procedure is well known in the art. In sum, tension is released from the drag ropes 44a, 44b. This allows the dump rope 40 to cycle through the dump block 100. The distance between the dump block 100 and the point at which the dump rope 40 attaches to the dump chains 20a, 20b decreases, thereby increasing the distance between the dump block 100 and the bucket arch 16. As the position of the dump block is fixed, the release of tension on the drag ropes 44a, 44b results in the lowering of the bucket front. When the bucket front is tipped below the bucket rear, the load sides through the bucket mouth.

A spreader bar 200 is shown between lower hoist chains 22a, 22b and upper hoist chains 24a, 24b. Upper hoist chains 24a, 24b attach to the primary hoist rigging 34 via fifth and sixth attachment means 26, 34. One end of spreader bar 200 is interconnected to the left upper hoist chain 24a and the left lower hoist chain 22a by first attachment means 28. The other end of spreader bar 200 is interconnected to the right upper hoist chain 24b and the right lower hoist chain 22b by a third attachment means 30. The lower left hoist chain 22a connects to the rear of the bucket 12 by second attachment means 36. Likewise, the right lower hoist chain 22b is similarly connected to the bucket 12. The spreader bar 200 prevents the upper and lower hoist chains 22, 24 from rubbing against the sides of the bucket. Rubbing can interfere with the ability of the bucket 12 to function.

Figure 2:
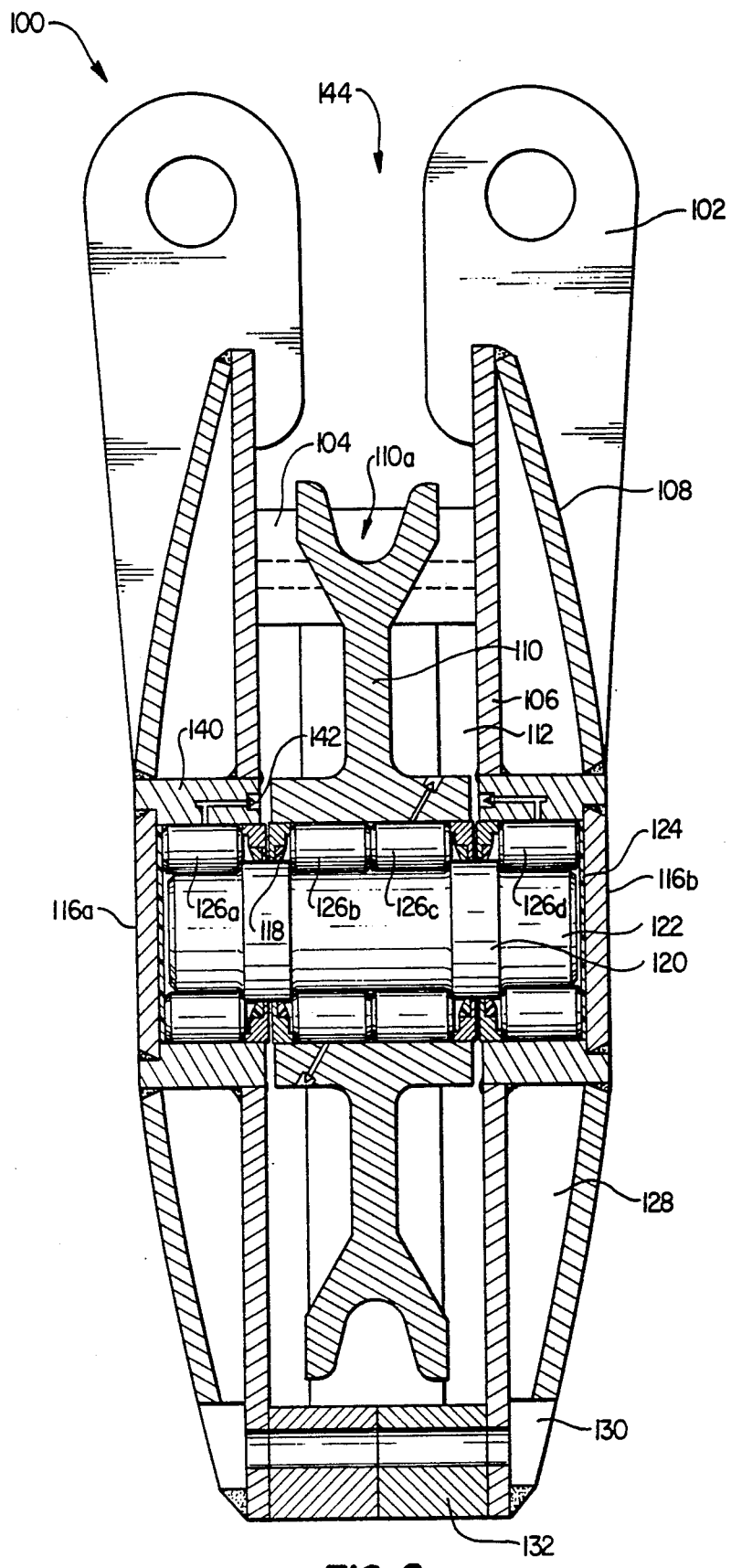
FIG. 2 is a sectional view across a dump block in accordance with the present invention.

FIG. 2 provides a sectional view of present dump block 100. The dump block generally comprises a housing with a dump block sheave or pulley 110 therebetween and rotatably mounted around a centrally located shaft 122. The housing comprises a pair of internal plates 106 attached to a pair of external plates 108. Both external plates 108 present a smooth convex surface as shown. The internal plates 106 form an opening in which the sheave 110 can freely rotate. The internal plates 106 are rigidly attached to side plate bearing carriers 140 thereby defining a central bore through which the shaft 122 passes.

Bearings, such as roller bearings, are placed between the sheave 110 and the shaft 122 and between the side plate bearing carrier 140 and the shaft 122. These bearings are spaced by a bearing separator 120. The bearings 126 are lubricated by an appropriate lubricant. A side plate bearing cap 116 and seal retainer 118 maintain the position of the bearings. Typically, four bearings 126a, 126b, 126c, 126d are used. A side plate bearing cushion 124 is positioned between the bearing 126a and side plate bearing cap 116 as well as between bearing 126d and side plate bearing cap 116b. The cushion 124 is typically made of a polyurethane or a rubber type material. The stiffness of the cushion 124 varies according to the application.

Two central bearings 126b, 126c are located between the sheave and the shaft. This configuration maintains perpendicular alignment between the shaft and the sheave. In other words, the bearings allow the shaft to be self-aligning. Lubrication ports 142 are provided as shown. Lubrication is typically added at the point of manufacture and the ports sealed.

The sheave 110 is generally circular with a distally located groove 110a. The groove 110a is dimensioned to engage a dump rope 40 (as shown in FIG. 1). The groove is accessible to the operator through a pair of dump block mouths 144. The dump block mouths 144 are formed along portions of the circumference of the dump block and between the opposed internal plates 106. The internal plates are attached by several spacers 104, 132. Each spacer can have several bolt holes therethrough. The spacers 104, 132 limit and define the size of each dump block mouth 144. Bolts are placed through the holes in the spacers 104, 132. Nuts are then attached to the bolts to secure the opposed internal plates together.

External side plates 108 attach to the internal plates 106 near the circumference of the dump block 100. A pair of main connecting eyes 102 extend from the external side plates. The main connecting eyes can be connected to the hoist rigging (as shown in FIG. 1). As discussed above, the external side plates present a smooth convex surface. Therefore, any blow to the dump block becomes a glancing blow. A plurality of internal gussets 128 are attached between the internal and external plates to add rigidity.

Figure 3:
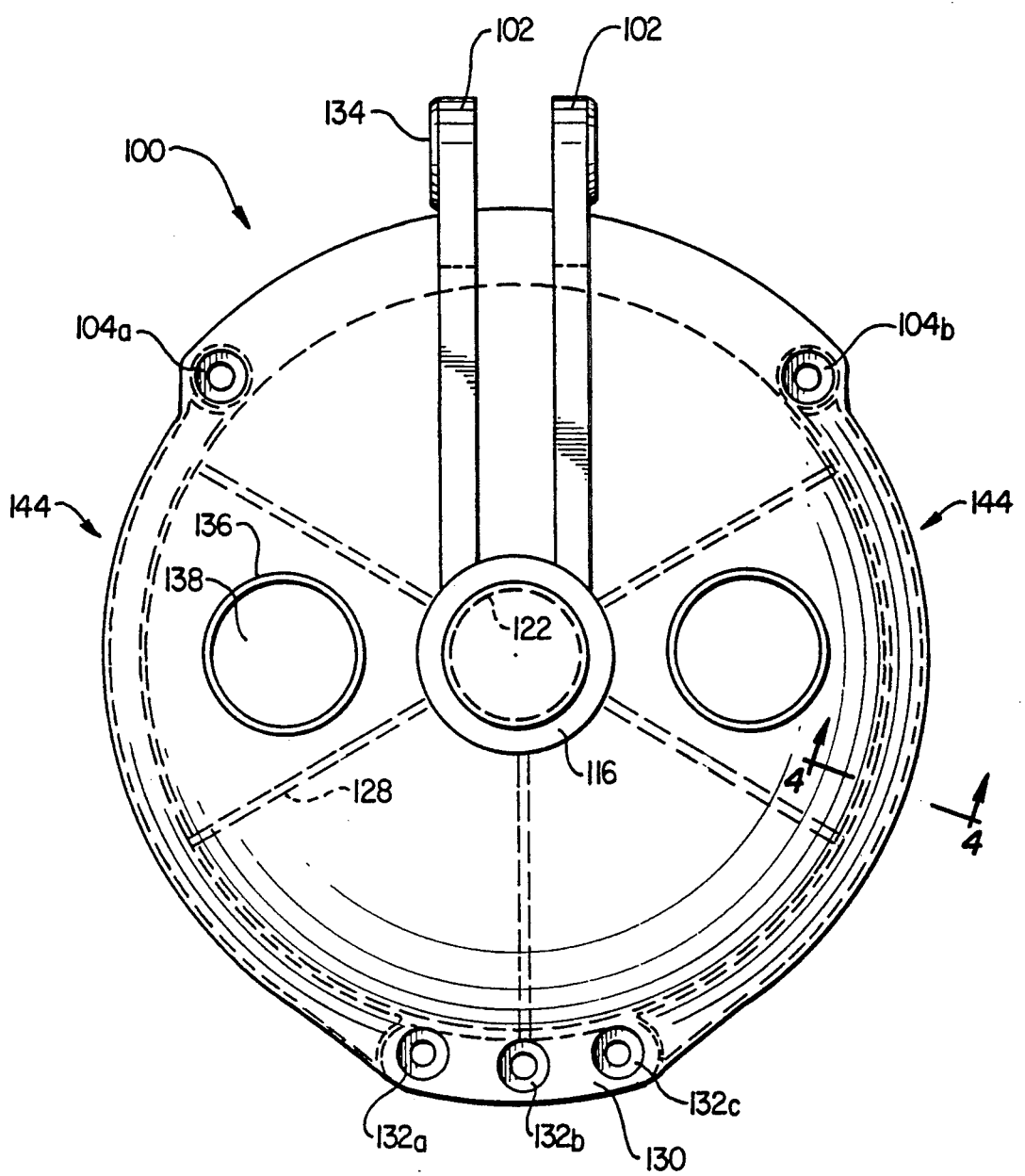
FIG. 3 is a side view of the dump block in accordance with the present invention.

FIG. 3 provides a side view of dump block 100. The external side plates 108 are generally circular. A pair of main connecting eyes 102 are shown extending from the external side plates. Each main connecting eye can have a bushing 134 within the circumference of its eye portion. Shaft 122 is shown in phantom behind the side plate bearing cap 116. Two additional side plate holes such as hole 138 penetrate the external side plate 108 making a portion of the sheave 110 visible. A side plate hole insert 136 is inserted into each hole to seal off the space between the internal and external plates. The internal gussets 128 are shown in phantom. Dump block mouths 144 are shown between spacers 104, 132. Bolts 104a, 104b are shown engaging the spacer 104 while bolts 132a, 132b, 132c are shown engaging spacer 132. Countersunk holes 130 provide space for the heads of bolts 132a, 132b, 132c.

Figure 4:
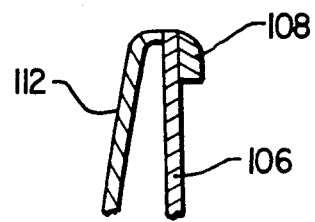
FIG. 4 is a sectional view across line 4—4 in FIG. 3.

FIG. 4 provides a sectional view across section line 4—4 in FIG. 3. The internal plate 106 is rigidly attached to both the external plate 108 and the scrub plate 112. The point of attachment is generally curved with a radius of curvature of approximately two inches in one embodiment. However, the radius of curvature of the attachment point can vary with the size of the dump block. The method of attachment can be welding. The curvature is an important advantage of the present invention. Namely, prior art dump blocks have a hard edge along their circumference. A dump rope passing through dump block could rub against that hard edge, fraying the rope. If the dump rope fails, the bucket might suddenly go vertical, dumping its load in the wrong location. The curved edge does not fray the dump rope nor promote kinks in the dump rope.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A dump block for strip mine rigging apparatus comprising:
    (a) a housing around a centrally located shaft, wherein said housing comprises:
        (i) a pair of opposed internal plates;
        (ii) a pair of opposed external plates rigidly attached to said internal plates, wherein each external plate presents a smooth convex external surface;
        (iii) hoist connection means attached to said external plates;
        (iv) a first spacer attached between the internal plates;
        (v) a second spacer attached between the internal plates;
    (b) a sheave rotatably mounted around said shaft and within said housing;
    (c) bearing means between said housing and said sheave; and
    (d) a bearing cushion means mounted between bearing means and the housing.

2. The dump block of claim 1 wherein the bearing cushion means is comprised of rubber.

3. The dump block of claim 1 wherein the bearing cushion means is comprised of polyurethane.

4. The dump block of claim 1 wherein the external plates are generally circular.

5. The dump block of claim 1 wherein the sheave comprises a disc with a distal groove configured to engage a dump rope.

6. The dump block of claim 1 wherein the housing further comprises:
    (f) a pair of dump block mouths, wherein each mouth is formed between the internal plates and between the first and second spacers.

7. The dump block of claim 1 wherein the bearing means further comprises lubrication means adjacent to the bearing means.

8. The dump block of claim 1 wherein the internal and external plates are attached by welding.

9. The dump block of claim 8 wherein the internal and external plates are welded to form a curved external seam.

* * * * *